United States Patent
Markley et al.

(10) Patent No.: US 9,618,096 B2
(45) Date of Patent: Apr. 11, 2017

(54) CHAIN OR BELT TENSIONER WITH A RATCHET THAT DEACTIVATES

(71) Applicant: BorgWarner Inc., Auburn Hills, MI (US)

(72) Inventors: George L. Markley, Montour Falls, NY (US); Simon Barrette, Lansing, NY (US); Dale N. Smith, Freeville, NY (US); Joseph P. Goodsell, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 106 days.

(21) Appl. No.: 14/653,381

(22) PCT Filed: Dec. 5, 2013

(86) PCT No.: PCT/US2013/073219
§ 371 (c)(1),
(2) Date: Jun. 18, 2015

(87) PCT Pub. No.: WO2014/099385
PCT Pub. Date: Jun. 26, 2014

(65) Prior Publication Data
US 2015/0354674 A1    Dec. 10, 2015

Related U.S. Application Data

(60) Provisional application No. 61/740,476, filed on Dec. 21, 2012, provisional application No. 61/831,250, filed on Jun. 5, 2013.

(51) Int. Cl.
*F16H 7/08* (2006.01)

(52) U.S. Cl.
CPC ............ *F16H 7/0848* (2013.01); *F16H 7/08* (2013.01); *F16H 2007/0806* (2013.01);
(Continued)

(58) Field of Classification Search
CPC .. F16H 7/08; F16H 7/0848; F16H 2007/0806; F16H 2007/0812; F16H 2007/0885; F16H 2007/0859

See application file for complete search history.

(56) References Cited

U.S. PATENT DOCUMENTS 5,304,099 A    4/1994  Deppe et al.
5,366,415 A    11/1994 Church et al.
(Continued)

FOREIGN PATENT DOCUMENTS

EP    1223364 A    7/2002
JP    64012165     1/1989
(Continued)

OTHER PUBLICATIONS

PCT International Search Report for PCT/US2013/073219 mailed on Mar. 26, 2014; 11 pgs.

*Primary Examiner* — William E Dondero
*Assistant Examiner* — Robert T Reese
(74) *Attorney, Agent, or Firm* — Brown & Michaels, PC

(57) ABSTRACT

A tensioner comprising a piston slidably received within a piston bore of the housing having a plurality of grooves formed on an outer circumference, the piston forming a first pressure chamber with the piston bore. The tensioner uses a mechanism to remove a sliding pawl or expandable clip from engaging the grooves on the piston, such that the piston can move towards the housing and reduce chain load when fluid pressure is reduced in the first pressure chamber during engine shutdown, but not so much as to leave the chain uncontrolled during engine restart. The mechanism may for example be a fluid biased spool piston which engages the expandable clip or a pawl piston that engages a sliding pawl.

4 Claims, 11 Drawing Sheets

(52) U.S. Cl.
CPC .............. *F16H 2007/0812* (2013.01); *F16H 2007/0859* (2013.01); *F16H 2007/0878* (2013.01); *F16H 2007/0885* (2013.01)

(56) References Cited

U.S. PATENT DOCUMENTS

| | | |
|---|---|---|
| 5,577,970 A | 11/1996 | Smith et al. |
| 5,911,641 A | 6/1999 | Sheren et al. |
| 5,967,921 A | 10/1999 | Simpson et al. |
| 6,120,402 A | 9/2000 | Preston et al. |
| 6,244,981 B1 | 6/2001 | Simpson |
| 6,478,703 B2 | 11/2002 | Suzuki |
| 6,612,951 B2 | 9/2003 | Kurohata |
| 6,685,587 B2 | 2/2004 | Rossato et al. |
| 7,455,607 B2 | 11/2008 | Narita et al. |
| 7,775,921 B2 | 8/2010 | Izutsu et al. |
| 2003/0134703 A1 | 7/2003 | Saitoh et al. |
| 2003/0186765 A1 | 10/2003 | Konishi et al. |
| 2004/0092348 A1 | 5/2004 | Hashimoto et al. |
| 2004/0127316 A1 | 7/2004 | Hashimoto et al. |
| 2004/0147349 A1 | 7/2004 | Markley et al. |
| 2004/0266571 A1 | 12/2004 | Izutsu et al. |
| 2006/0160645 A1 | 7/2006 | Markley et al. |
| 2006/0270500 A1* | 11/2006 | Yamamoto ............ F16H 7/0836 474/109 |
| 2010/0298077 A1 | 11/2010 | Hirayama et al. |
| 2010/0298078 A1 | 11/2010 | Hirayama et al. |
| 2011/0130232 A1 | 6/2011 | Barrette et al. |
| 2014/0179471 A1* | 6/2014 | Markley ............... F16H 7/0836 474/110 |

FOREIGN PATENT DOCUMENTS

| | | |
|---|---|---|
| JP | 2559664 | 9/1997 |
| JP | 2002039295 A | 2/2002 |
| JP | 2003240071 | 8/2003 |
| JP | 2010270810 A | 12/2010 |
| WO | 2006078445 A1 | 7/2006 |
| WO | 2009015174 A1 | 1/2009 |

* cited by examiner

CHAIN OR BELT TENSIONER WITH A RATCHET THAT DEACTIVATES

BACKGROUND OF THE INVENTION

Field of the Invention

The invention pertains to the field of tensioners. More particularly, the invention pertains to a chain or belt tensioner with a ratchet that deactivates.

Description of Related Art

In chain and belt tensioners, pistons are urged from their housings by a spring or a spring plus hydraulic pressure. Check valves are added to tensioners between the pressurized fluid source and the fluid chamber formed in the bore between the housing and the piston, to prevent backflow of the hydraulic fluid out of the fluid chamber. The rate of leakage through the clearance between the piston and the bore allows the retraction of the piston as makeup fluid subsides or ceases. As the rate of leakage increases, the resistance to retraction of the piston lessens and as the rate of leakage decreases, the resistance to retraction of the piston increases. When chain load spikes or a loss of fluid pressure is present, retraction of the plunger occurs and if the retraction of the plunger is excessive, loss of chain control, loss of engine time or other undesirable effects occur. Therefore, limiting the amount of piston retraction is desirable.

The common practice of tuning a tensioner to a system by changing the fluid leak rate occasionally results in a desired normal state piston retraction, which exceeds what is desired during startup or engine operation and shutdown. Tuning a tensioner to properly control system dynamics may also result in excessive piston extension or pump-up that may cause high chain loading or piston binding. This often results in a tensioner tune that is less than optimal in order to prevent the piston from extending beyond the allowable limit.

SUMMARY OF THE INVENTION

In one embodiment, a tensioner comprising a piston slidably received within a piston bore having a plurality of grooves formed on an outer circumference, the piston forming a first pressure chamber with the piston bore. The tensioner uses a mechanism to remove a sliding pawl or expandable clip from engaging the grooves on the piston, such that the piston can move towards the housing and reduce chain load when fluid pressure is reduced in the first pressure chamber during engine shutdown, but not so much as to leave the chain uncontrolled during engine restart. The mechanism may for example be a fluid biased spool piston which engages the expandable clip or a pawl piston that engages a sliding pawl.

In another embodiment, a tensioner comprising a piston slidably received within a piston bore having a plurality of grooves formed on an outer circumference, the piston forming a first pressure chamber with the piston bore.

When force of the pressure of the fluid supplied to a pressure chamber opposite the spool piston spring is greater than the spool piston spring, the second spool piston shoulder disengages a leg of the contractible circlip, expanding the ring shaped body of the contractible circlip, disengaging the ring shaped body of the contractible circlip from the grooves on the outer circumference of the piston, such that the piston can move towards the housing and reduce chain load when fluid pressure is reduced in the first pressure chamber during engine shutdown.

DETAILED DESCRIPTION OF THE INVENTION

Figure 1:
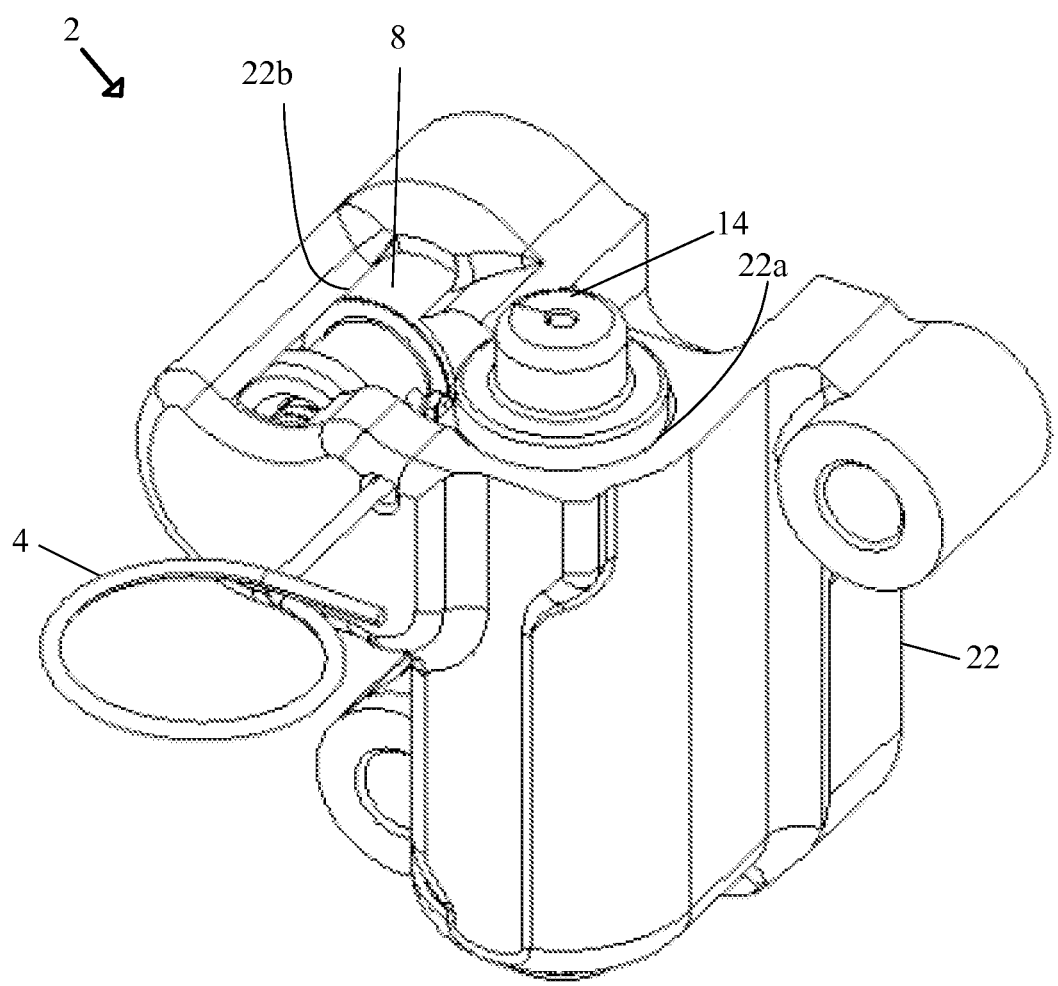
FIG. 1 shows an isometric view of a tensioner of a first embodiment.
Figure 2:
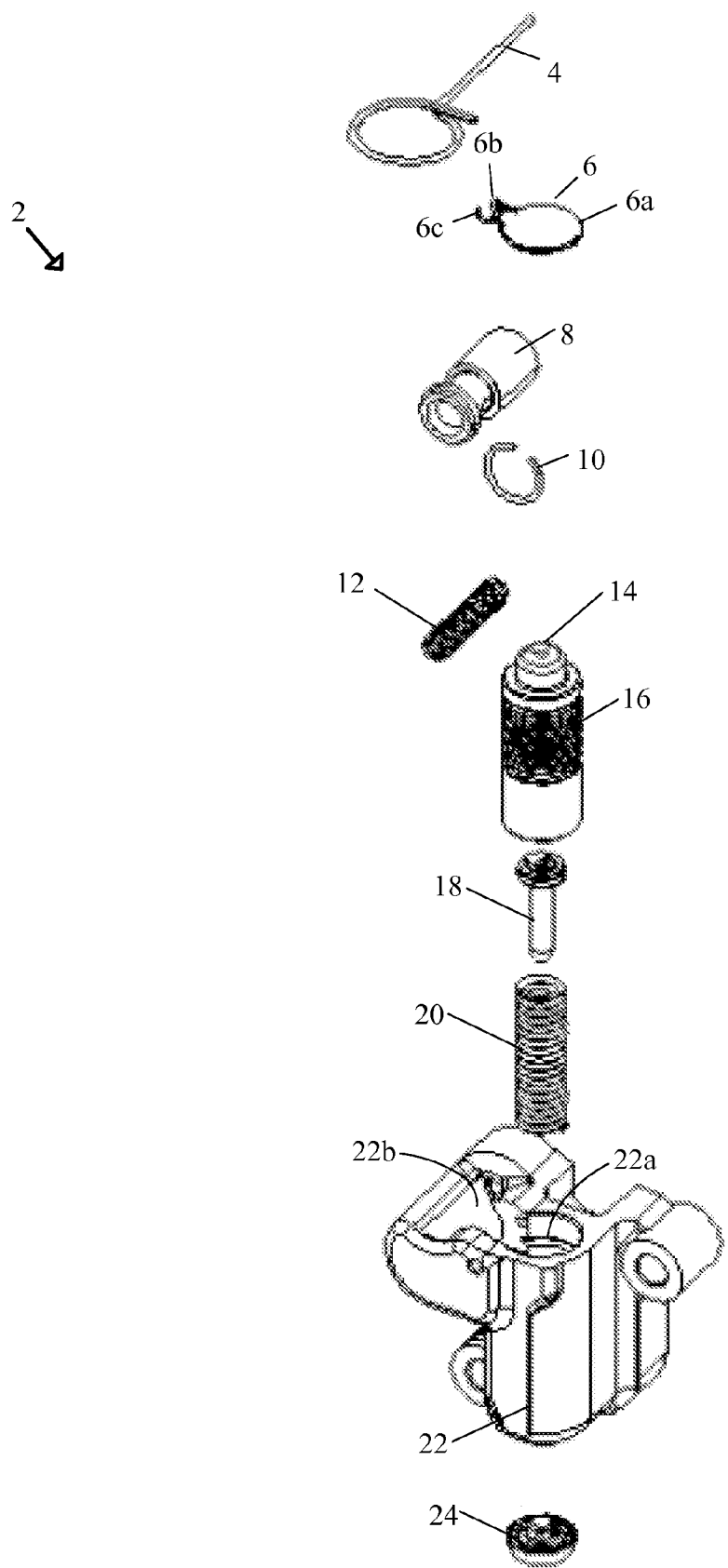
FIG. 2 shows an isometric exploded view of the first embodiment.

The tensioner systems of the present invention include a tensioner 2 (described in further detail below) for a closed loop chain drive system used in an internal combustion engine. It may be utilized on a closed loop power transmission system between a driveshaft and at least one camshaft or on a balance shaft system between the driveshaft and a balance shaft. The tensioner system may also include an oil pump and be used with fuel pump drives. Additionally, the tensioner system of the present invention may also be used with belt drives.

The embodiments of the present invention are designed to disengage a ratcheting device, for example an expandable circlip or a pawl plate, when the limits of piston retraction of the tensioner are too restrictive during normal engine running conditions.

FIGS. 1-4 show a tensioner 2 of a first embodiment. The tensioner 2 has a housing 22 with a piston bore 22a connected to a spool piston bore 22b. A housing shoulder 22c is present between the piston bore 22a and the spool piston bore 22b. The piston bore 22a slidably receives a piston 14. The outer circumference of the piston 14 has a series of grooves 16 each with a shoulder 16a and a ramp 16b around or across at least a portion of the outer circumference of the piston 14. Preferably at least one of the grooves 16 acts as a stop groove 17 to help prevent ejection of the piston 14 from the housing 22. The piston bore 22a is in fluid communication with a first supply 25 through an inlet check valve 24. The inlet check valve 24 allows fluid to flow from the first supply 25 into a first pressure chamber formed 19 between the piston 14 and the piston bore 22a of the housing 22.

An expandable circlip 6 having an expandable ring shaped body 6a connected to a first leg 6b and a second leg 6c engages the grooves 16 of the piston 14. The expandable circlip 6 has a free state in which the ring shaped body 6a is engaged with the plurality of grooves 16 of the piston 14 and allows limited movement of the piston 14 outwards from the housing 22, and an expanded state in which the ring shaped body 6a is expanded and disengaged from the plurality of grooves 16 of the piston 14. When the expandable ring shaped body 6a of the expandable circlip 6 engages the shoulder 16a of the grooves 16, extension of the piston 14 outwards from the housing 22 is limited. When the expandable ring shaped body 6a of the expandable circlip 6 engages the ramp 16b of the grooves 16, the expandable circlip 6 allows movement of the piston 14 outwards from the housing 22 and prevents movement of the piston 14 towards the housing 22.

Within the piston 14 is a piston spring 20 for biasing the piston 14 outwards from the housing 22 and towards a belt or chain (not shown). A volume reducer 18 may be present between the piston 14 and the piston spring 20.

The spool piston bore 22b has a first end in fluid communication with a second supply 26. The spool piston bore 22b receives a spool piston 8. The spool piston 8 translates fluid pressure from the second supply 26 into a directional force. A second pressure chamber 28 is formed between the spool piston bore 22b and the spool piston 8.

The spool piston 8 has a cutout 8a of a length L defined by a first spool piston shoulder 8b and a second spool piston shoulder 8c. The spool piston 8 is biased towards the first end of the spool piston bore 22b by a spool piston spring 12 at the second end of the spool piston bore 22b. The travel of the spool piston 8 is limited within the spool piston bore 22b by a circlip 10 which acts as a stop.

Figure 3:
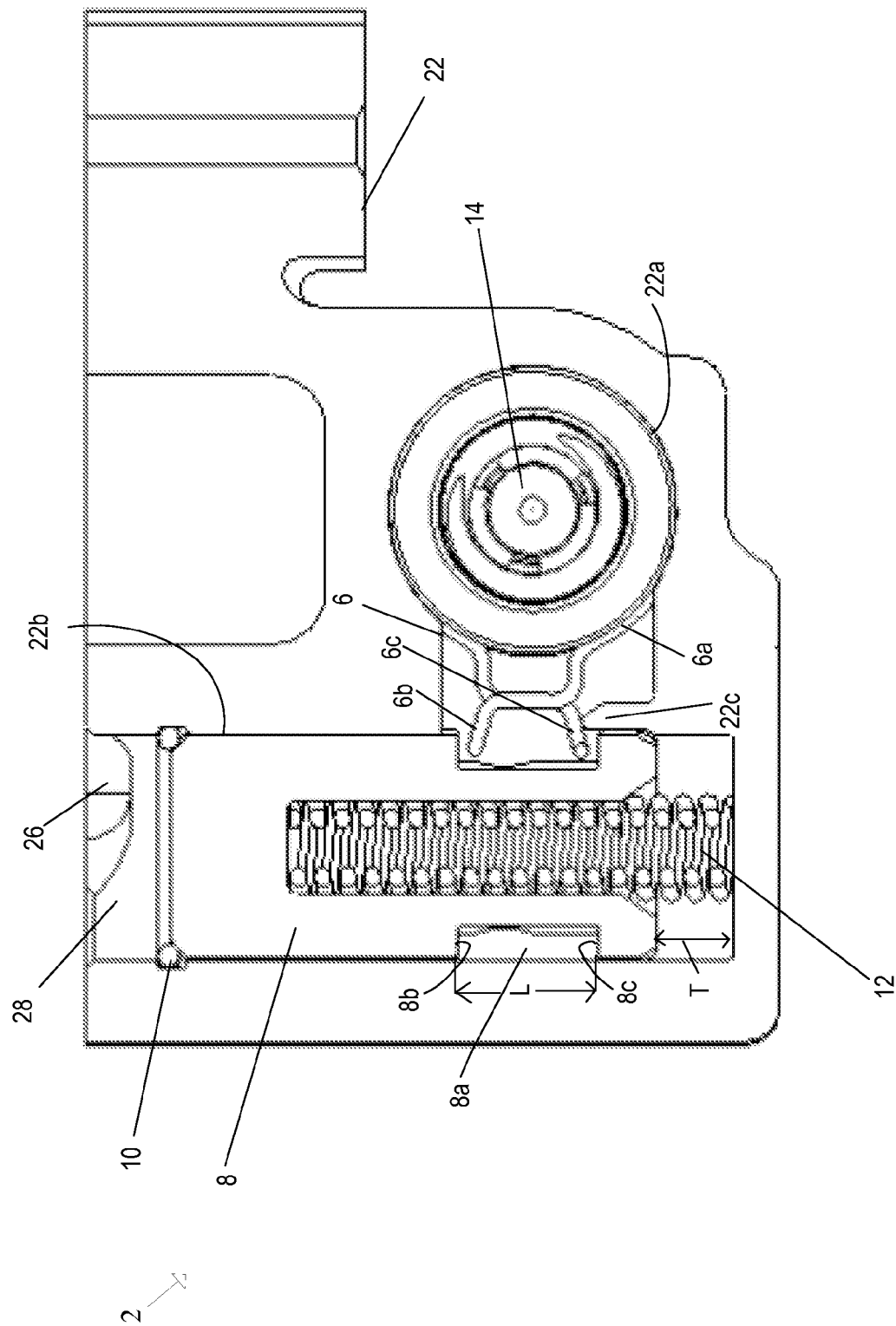
FIG. 3 shows an isometric view sectioned to show the ratchet engaged with the piston of the tensioner of the first embodiment.
Figure 4:
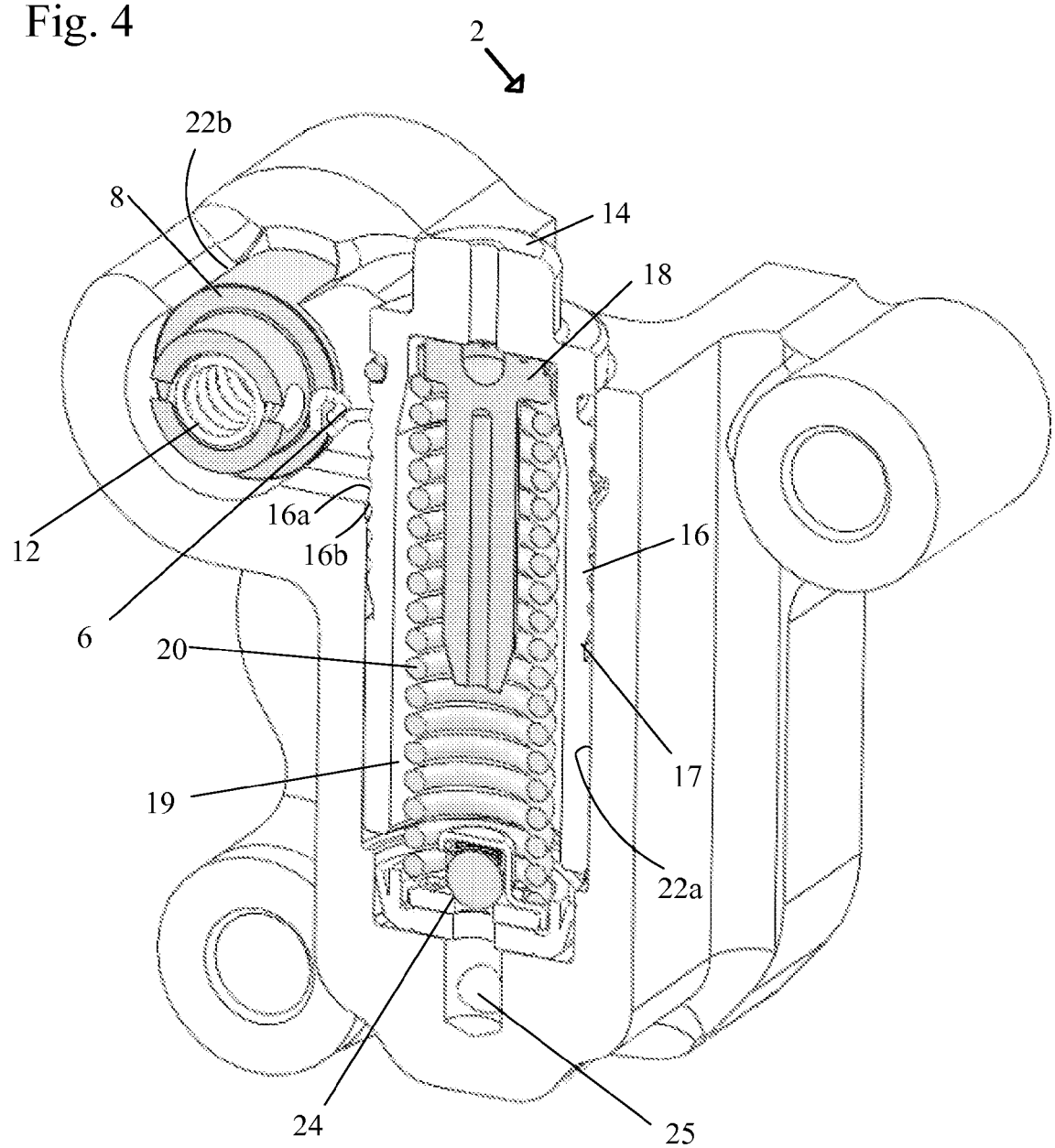
FIG. 4 shows another isometric view sectioned to show the ratchet engaged with the piston of the tensioner of the first embodiment.
Figure 5:
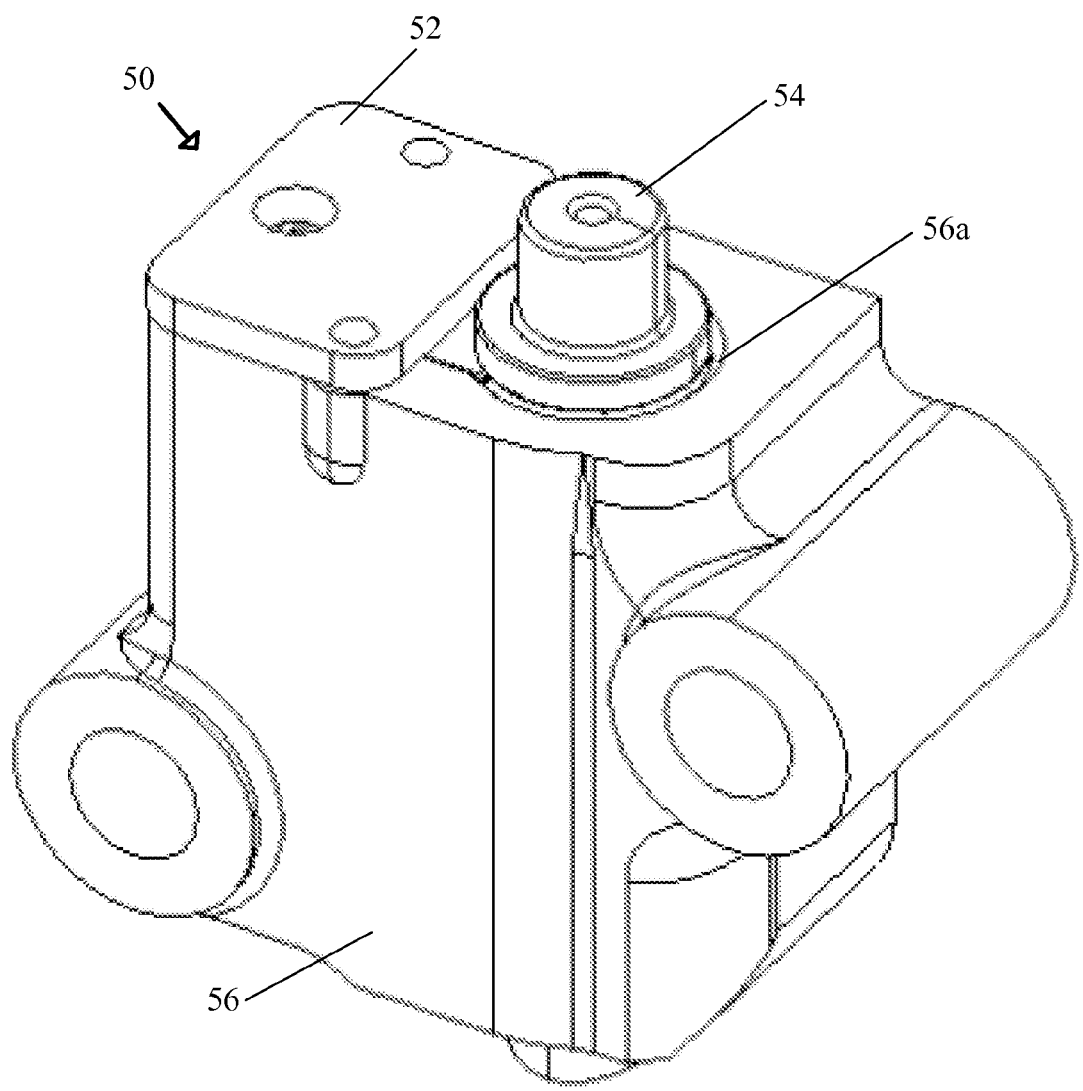
FIG. 5 shows an isometric view of a tensioner of a second embodiment.
Figure 6:
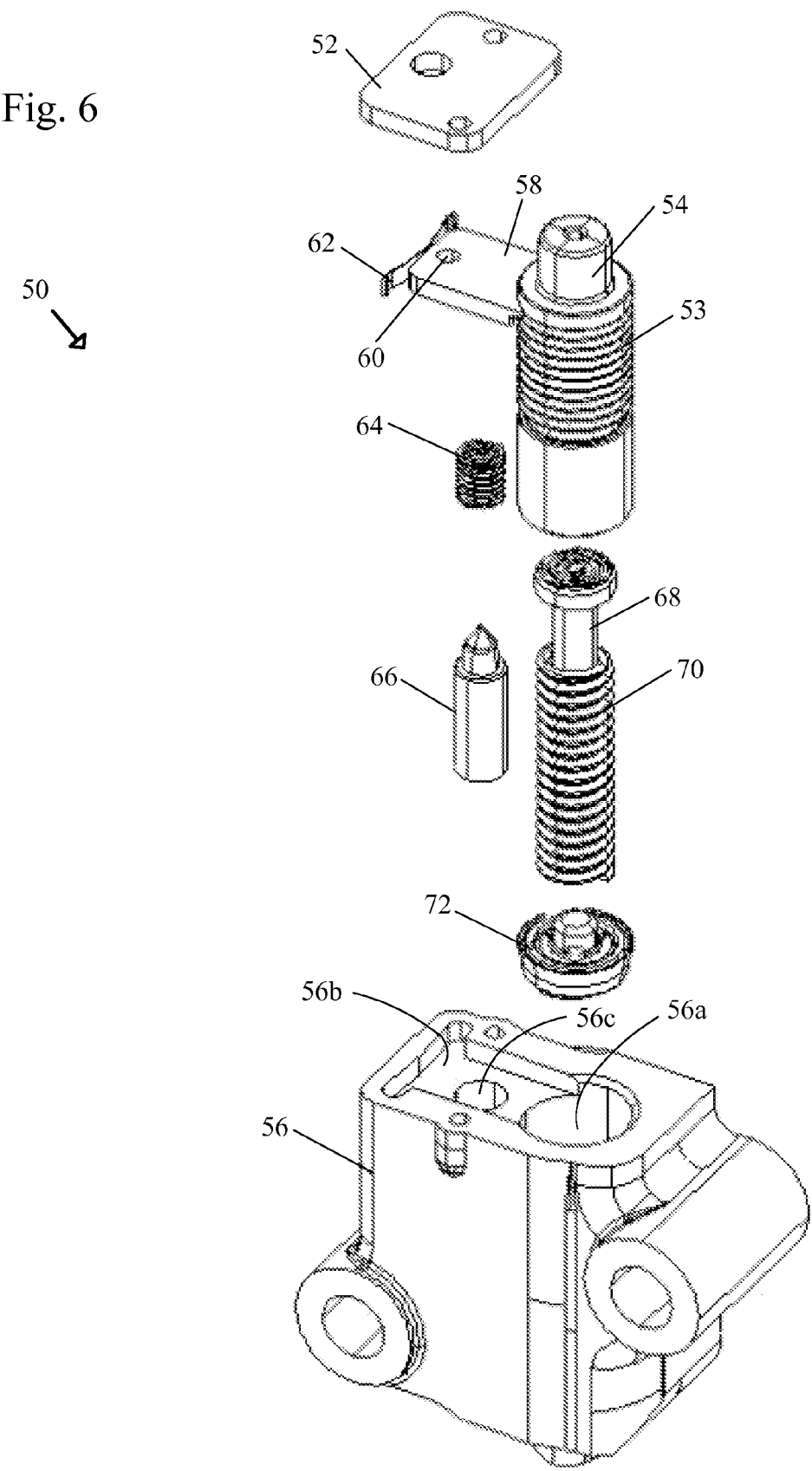
FIG. 6 shows an isometric exploded view of the second embodiment.
Figure 7:
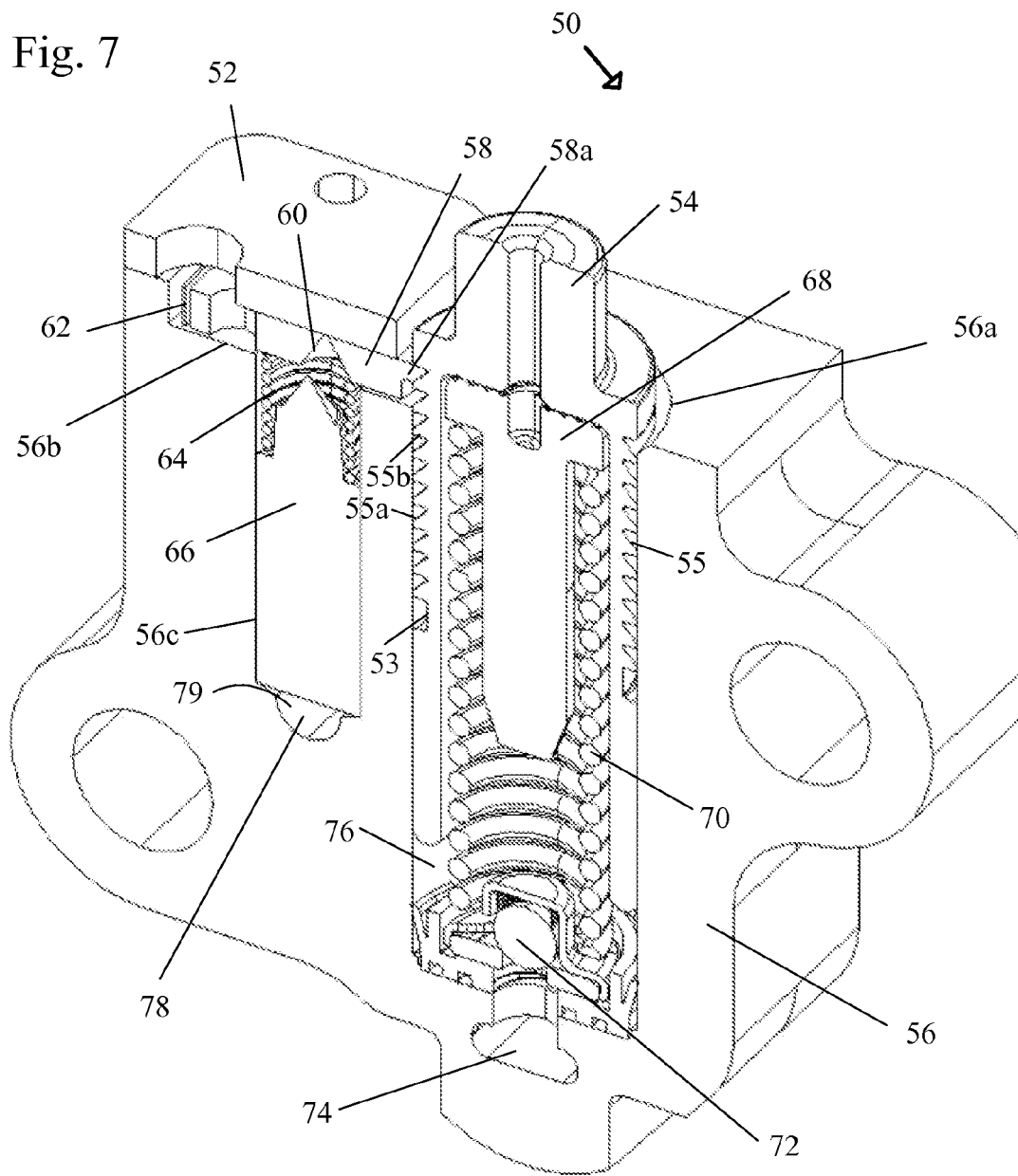
FIG. 7 shows an isometric view sectioned to show the ratchet engaged with the piston of the tensioner of the second embodiment.
Figure 8:
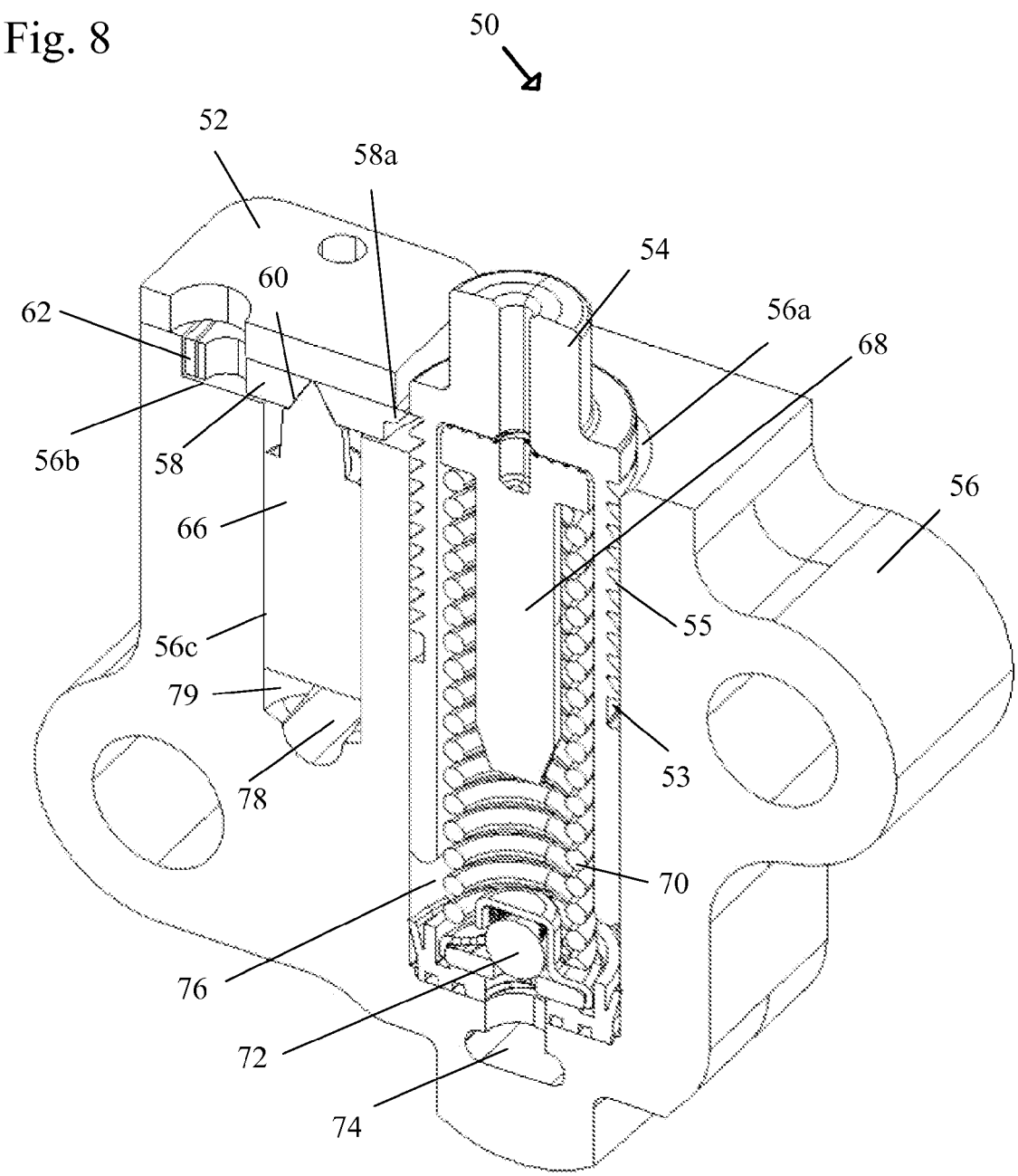
FIG. 8 shows an isometric view sectioned to show the ratchet disengaged with the piston of the tensioner of the second embodiment.

Therefore, in FIG. 3, the spool piston 8 is in a fully extended spool piston position at the end of travel, with the spool piston 8 in contact with the circlip 10. The total travel distance that spool piston 8 can travel is indicated by T.

The legs 6b, 6c of the expandable circlip 6 are received within the cutout 8a of the spool piston 8 and the second leg 6c engages the housing shoulder 22c. The housing shoulder 22c may be secured to the second leg 6c. The engagement of the expandable circlip 6 with the housing shoulder 22c prevents the expandable circlip 6 from rotating when force is applied to the first leg 6b to expand the ring shaped body 6a of the expandable circlip 6 and disengage the expandable circlip 6 from the grooves 16 of the piston 14.

The length L of the cutout 8a is preferably sufficiently long enough to accommodate the legs 6b, 6c of the expandable circlip 6 without applying any force to legs 6b, 6c which might cause the expandable body 6a of the circlip 6 to expand and disengage from the grooves 16 on the piston 14. The length L of the cutout 8a is also of a sufficient length to accommodate the expandable clip 6 during assembly, since the expandable clip 6 is in its free state and the legs 6b, 6c are actually farther apart since the expandable clip 6 is not yet expanded over the piston 14.

A second pressure chamber 28 is defined as the portion of spool piston bore 22b at the end of spool piston 8 which is opposite bias spring 12. When fluid is supplied to the second pressure chamber 28, the pressure of the fluid biases the spool piston 8 against the force of the spool piston spring 12, moving the spool piston 8 away from the second supply 26, such that the first spool piston shoulder 8b of the cutout 8a of the spool piston 8 exerts a force on a first leg 6b of the expandable circlip 6 and in doing so also exerts a force on a second leg 6c of the expandable circlip through the housing shoulder 22c. Force on both of the legs 6b, 6c of the expandable clip 6 from opposite directions causes the ring shaped body 6a to expand and be in the expanded state. The expansion of the ring shaped body 6a of the expandable circlip 6 disengages the ring shaped body 6a from the grooves 16 on the piston 14.

With the expandable circlip body 6a in the expanded state and disengaged from the grooves 16 on the piston 14, the piston 14 is no longer prevented from retracting or moving in towards the housing 22 as long as sufficient pressure is present in the second pressure chamber 28.

This allows the piston 14 to retract and reduce chain load when fluid pressure is reduced during engine shutdown, but not so much as to leave the chain uncontrolled during engine restart. This also allows the piston 14 to extend out as far as required by the timing drive to control the drive at high engine speed but return back to a lower extension at low engine speed but still prevent tooth jump during engine shutdown. The retraction of the piston 14 is limited by the amount of backlash of the expandable circlip 6. However, it should be noted that nothing limits retraction of the piston 14 when the pressure in the second pressure chamber 28 is sufficient to prevent the spool piston 8 from being biased by the spring towards the first end of the spool piston bore 22b.

As pressure in the second pressure chamber 28 decreases, the spool piston spring 12 biases the spool piston 8 towards the second fluid supply 26, removing the force exerted on the legs 6b, 6c of the expandable circlip 6 and allowing the expandable ring shaped body 6a of the circlip 6 to engage the grooves 16 of the piston 14 and restrict the movement of the piston 14 towards the housing 22.

A lock pin 4 may lock the spool piston 8 in place for shipping or assembly, preventing any movement during these processes.

In one embodiment the first supply 25 is connected to the second supply 26. In an alternate embodiment, the first supply 25 and second supply 26 are not directly connected.

While the spool piston 8 is shown as being received within a radially extending bore of the housing 22b, other configurations and arrangements of the spool piston 8 relative to the piston 14 and the expandable circlip 6 may be used to apply force to the legs 6b, 6c of the expandable circlip 6, such that the ring shaped body 6a of the expandable circlip 6 does not engage the grooves 16 of the piston 14.

In another alternate embodiment, the spool piston spring 12 would bias the spool piston 8 so that the first spool piston shoulder 8b of the cutout 8a of the spool piston 8 exerts a force on a first leg 6b of the expandable circlip 6 and in doing so also exerts a force on a second leg 6c of the expandable circlip through the housing shoulder 22c. The force on the legs 6b, 6c of the circlip 6 would be removed when fluid pressure was provided to a second pressure chamber from the first pressure chamber 19 of the tensioner.

FIGS. 5-8 show a second embodiment of the present invention. It should be noted that the pawl piston spring 64 is omitted from FIG. 8 for clarity purposes. The tensioner 50 has a housing 56 with a piston bore 56a connected to a pawl bore 56b, as well as a piston pawl bore 56c. The piston bore 56a slidably receives a piston 54. The outer circumference of the piston 54 has a series of grooves 55 each with a shoulder 55a and a ramp 55b around or across at least a portion of the outer circumference of the piston 54. Preferably at least one of the grooves 55 acts as a stop groove 53 to help prevent ejection of the piston 54 from the housing 56.

The piston bore 56a is in fluid communication with a first supply 74 through an inlet check valve 72. The inlet check valve 72 allows fluid to flow from the first supply 74 into a first pressure chamber 76 formed between the piston 54 and the piston bore 56a of the housing 56.

Within the piston 54 is a piston spring 70 for biasing the piston 54 outwards from the housing 56 and towards a belt or chain. A volume reducer 68 may be present between the piston 54 and the piston spring 70.

The pawl bore 56b receives a flat pawl plate 58. The flat pawl plate 58 has a first end with at least one tooth 58a for engagement with the grooves 55 on the outer circumference of the piston 54. A second end of the flat pawl plate 58, opposite the first end is biased by a pawl spring 62 towards the piston 54 and contact with the grooves 55 on the outer circumference of the piston 54. The pawl spring 62 is preferably a leaf spring. The flat pawl plate 58 also has a hole 60 formed along its length. The hole 60 is preferably formed along the length of the flat pawl plate 58 such that when engaged by a pawl piston 66 as described below, the piston 54 can move within the piston bore 56a without the grooves 56 of the piston 54 engaging the flat pawl plate 58.

The piston pawl bore 56c is slidably receives a pawl piston 66. The pawl piston 66 translates fluid pressure from the second supply 78 into a directional force. The pawl piston 66 is biased towards the housing 56 by a pawl piston spring 64. The pawl piston 66 is biased outwards from the housing 56 by fluid pressure from a second fluid supply 78.

A second pressure chamber 79 is defined as the portion of piston pawl bore 55c at the end of pawl piston 66 which is opposite pawl piston spring 64. When pressure from fluid in the second pressure chamber 79 is greater than the force of the pawl piston spring 64, the end of the pawl piston 66 engages the hole 60 of flat pawl plate 58 and prevents the at least one tooth 58 of the flat pawl plate 58 from engaging the grooves 56 on the outer circumference of the piston 54.

With the at least one tooth 58a of the flat pawl 58 disengaged from the grooves 56 on the piston 54, the piston 54 is no longer prevented from retracting as long as sufficient pressure is present in the second pressure chamber 79. This allows the piston 54 to retract and reduce chain load when fluid pressure is reduced during engine shutdown, but not so much as to leave the chain uncontrolled during engine restart. The retraction of the piston 54 is limited by the amount of the flat pawl plate 58. However, it should be noted that nothing limits retraction of the piston 54 when the pressure in the second pressure chamber 79 is sufficient to prevent the pawl piston 64 from being biased by the spring away from the hole 60 in the flat pawl plate 58.

As pressure in the second pressure chamber 79 decreases, the pawl piston spring 64 biases the pawl piston 66 towards the housing 56, the pawl piston 66 disengages the hole 60 in the flat pawl plate 58, allowing the pawl spring 62 to bias the at least one tooth 58a of the flat pawl plate 58 to engage the grooves 56 of the piston 54 and restricting the movement of the piston 54 towards the housing 56.

When the tensioner 50 is assembled, a cover 52 covers the pawl bore 56b and the piston pawl bore 56c to prevent the flat pawl bore 58 from being dislodged from the housing and to resist the force of the pawl piston 66.

In one embodiment, the end of the pawl piston 66 that engages the hole 60 in the flat pawl plate 58 and the hole 60 itself may be conically shaped, although other shapes may also be used to establish a wedge type contact between the pawl piston 66 and the hole 60 of the flat pawl plate 58.

In another embodiment the first supply 74 is connected to the second supply 78. In an alternate embodiment, the first supply 74 and second supply 78 are not directly connected.

Figure 9:
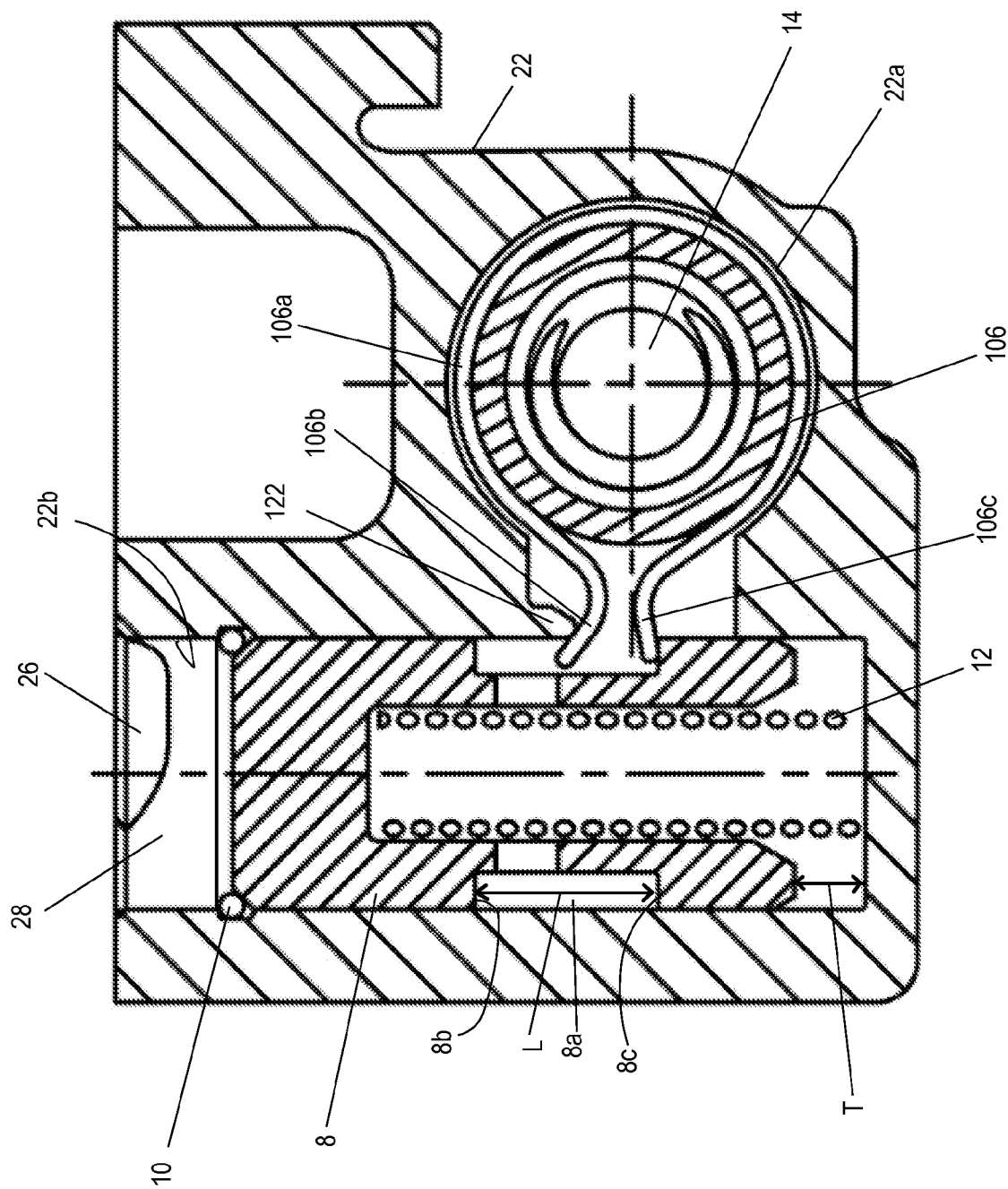
FIG. 9 shows an isometric view sectioned to show the ratchet engaged with the piston of a tensioner of a third embodiment.
Figure 10:
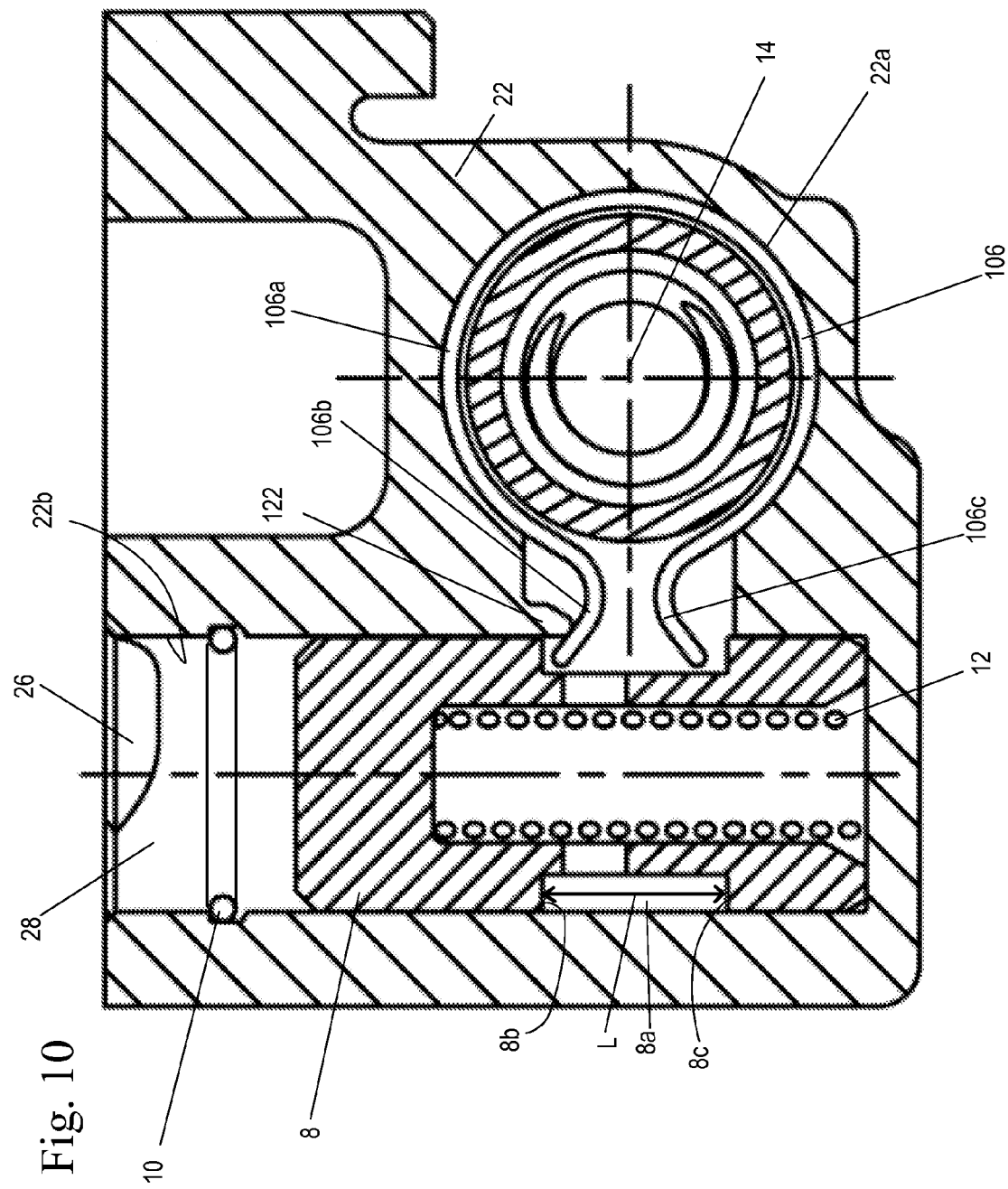
FIG. 10 shows an isometric view sectioned to show the ratchet disengaged with the piston of a tensioner of a third embodiment.
Figure 11:
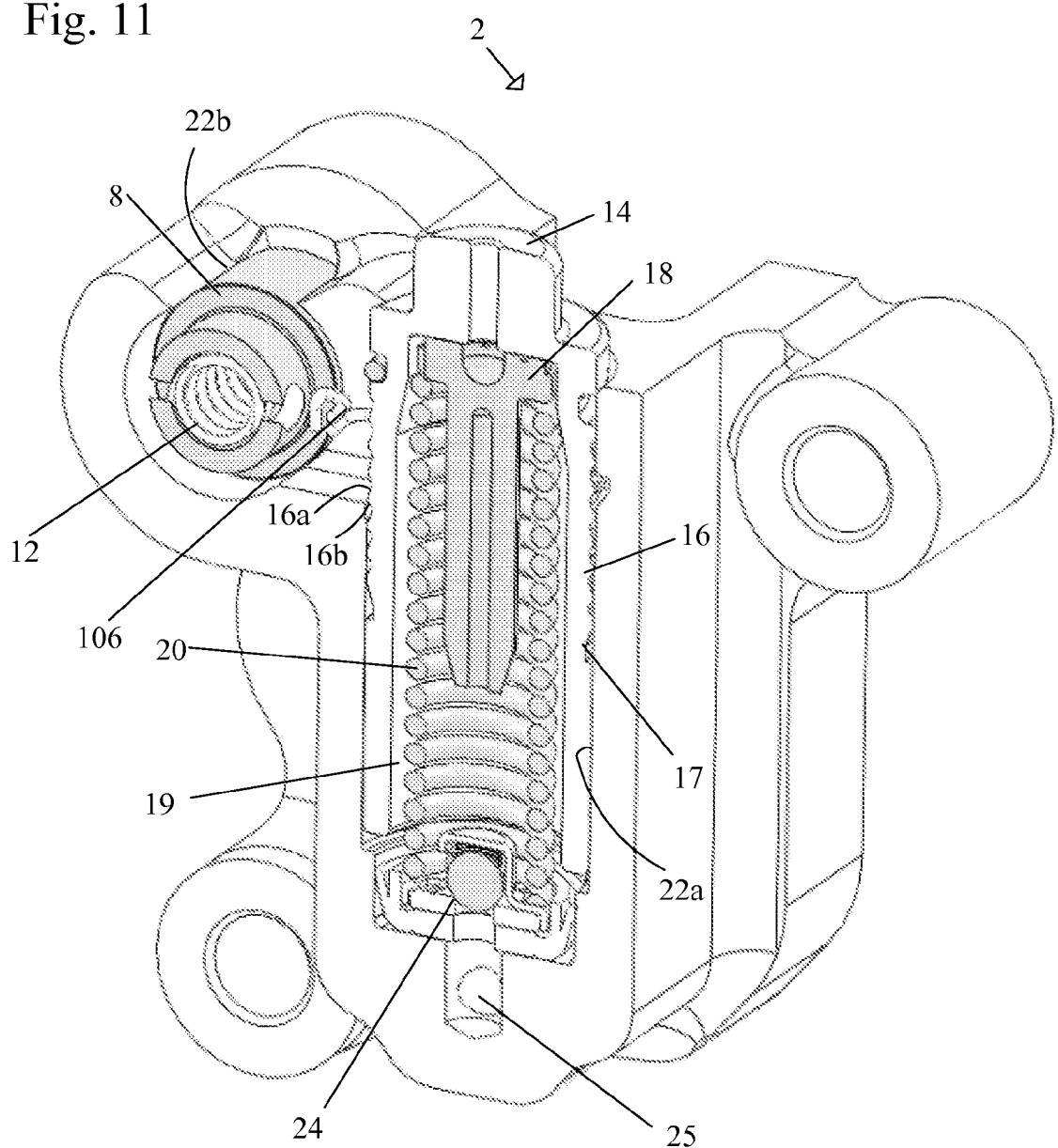
FIG. 11 shows another isometric view sectioned to show the ratchet engaged with the piston of the tensioner of the third embodiment

FIGS. 9-11 show a third embodiment of the present invention. The tensioner 2 has a housing 22 with a piston bore 22a connected to a spool piston bore 22b. A housing shoulder 122 is present between the piston bore 22a and the spool piston bore 22b. The piston bore 22a slidably receives a piston 14. The outer circumference of the piston 14 has a series of grooves 16 each with a shoulder 16a and a ramp 16b around or across at least a portion of the outer circumference of the piston 14. Preferably at least one of the grooves 16 acts as a stop groove 17 to help prevent ejection of the piston 14 from the housing 22. The piston bore 22a is in fluid communication with a first supply 25 through an inlet check valve 24. The inlet check valve 24 allows fluid to flow from the first supply 25 into a first pressure chamber formed 19 between the piston 14 and the piston bore 22a of the housing 22.

A contractible circlip 106, having a contractible ring shaped body 106a connected to a first leg 106b and a second leg 106c, engages the grooves 16 of the piston 14. The contractible circlip 106 has a free state in which the ring shaped body 106a is expanded and disengaged from the plurality of grooves 16 of the piston 14, and an unfree state in which the ring shaped body 106a is contracted and engaged with the plurality of grooves 16 of the piston 14 and allows limited movement of the piston 14 outwards from the housing 22. It should be noted that these states are the opposite of the tensioner of the first embodiment, where, in the free state the circlip engaged the piston 14 and in the expanded state is disengaged from the piston 14.

When the contractible ring shaped body 106a of the contractible circlip 106 engages the shoulder 16a of the grooves 16, extension of the piston 14 outwards from the housing 22 is limited. When the contractible ring shaped body 106a of the contractible circlip 106 engages the ramp 16b of the grooves 16, the contractible circlip 106 allows movement of the piston 14 outwards from the housing 22 and prevents movement of the piston 14 towards the housing 22.

Within the piston 14 is a piston spring 20 for biasing the piston 14 outwards from the housing 22 and towards a belt or chain (not shown). A volume reducer 18 may be present between the piston 14 and the piston spring 20.

The spool piston bore 22b has a first end in fluid communication with a second supply 26. The spool piston bore 22b receives a spool piston 8. The spool piston 8 translates fluid pressure from the second supply 26 into a directional force. A second pressure chamber 28 is formed between the spool piston bore 22b and the spool piston 8.

The spool piston 8 has a cutout 8a of a length L defined by a first spool piston shoulder 8b and a second spool piston shoulder 8c. The spool piston 8 is biased towards the first end of the spool piston bore 22b by a spool piston spring 12 at the second end of the spool piston bore 22b. The travel of the spool piston 8 is limited within the spool piston bore 22b by a circlip 10 which acts as a stop.

Therefore, in FIG. 9, the spool piston 8 is in a fully extended spool piston position at the end of travel, with the spool piston 8 in contact with the circlip 10. The total travel distance that spool piston 8 can travel is indicated by T and indicates the different positions at the ends of the travel. A position of the spool piston 8 in which the second piston shoulder 8c of the spool piston 8 is disengaged from the leg 106c of the contractible clip 106 (FIG. 10) to a position in which the second piston shoulder 8*c* of the spool piston engages the leg 106*c* of the contractible clip 106 (FIG. 9).

The legs 106*b*, 106*c* of the contractible circlip 106 are received within the cutout 8*a* of the spool piston 8 and the first leg 106*b* engages the housing shoulder 122. The housing shoulder 122 may be secured to the first leg 106*b*. The engagement of the contractible circlip 106 with the housing shoulder 122 prevents the contractible circlip 106 from rotating when force is applied to the second leg 106*c* to allow the ring shaped body 106*a* of the contractible circlip 106 to contract and engage the contractible circlip 106 with the grooves 16 of the piston 14.

The length L of the cutout 8*a* is preferably sufficiently long enough to accommodate the legs 106*b*, 106*c* of the contractible circlip 106 without applying any force to legs 106*b*, 106*c*, which might cause the contractible body 106*a* of the circlip 106 to engage the grooves 16 on the piston 14. The length L of the cutout 8*a* is also of a sufficient length to accommodate the contractible clip 106 during assembly, since the contractible clip 6 is in its free state and the legs 6*b*, 6*c* are actually farther apart since the contractible clip 6 is not yet expanded over the piston 14.

A second pressure chamber 28 is defined as the portion of spool piston bore 22*b* at the end of spool piston 8 which is opposite bias spring 12. When fluid is supplied to the second pressure chamber 28, the pressure of the fluid biases the spool piston 8 against the force of the spool piston spring 12, moving the spool piston 8 away from the second supply 26, such that any force of the second spool piston shoulder 8*c* is removed from being exerted on the legs 106*b*, 106*c* of the contractible circlip 106 as shown in FIG. 10. With the force of the second spool piston shoulder 8*c* removed from being exerted on legs 106*b*, 106*c* of the contractible circlip 106, the ring shaped body 106*a* expands and is in the free state. The expansion of the ring shaped body 106*a* of the contractible circlip 106 disengages the ring shaped body 106*a* from the grooves 16 on the piston 14.

With the contractible circlip body 106*a* in the free state and disengaged from the grooves 16 on the piston 14, the piston 14 is no longer prevented from retracting or moving in towards the housing 22 as long as sufficient pressure is present in the second pressure chamber 28.

As pressure in the second pressure chamber 28 decreases, the spool piston spring 12 biases the spool piston 8 towards the second fluid supply 26, and the second piston shoulder 8*c* of the cutout 8*a* of the spool piston 8 exerts a force on a second leg 106*c* of the contractible circlip 106 and in doing so also exerts a force on a first leg 106*b* of the contractible circlip through the housing shoulder 122. Force on both of the legs 106*b*, 106*c* of the contractible clip 106 from opposite directions allows the contractible ring shaped body 106*a* of the circlip 106 to contract and engage the grooves 16 of the piston 14 and restrict the movement of the piston 14 towards the housing 22 at engine shutdown.

The length of the travel, T of the spool piston 8 between a position in which the second piston shoulder 8*c* of the spool piston 8 is disengaged from the leg 106*c* of the contractible clip 106 (FIG. 10) to a position in which the second piston shoulder 8*c* of the spool piston engages the leg 106*c* of the contractible clip 106 (FIG. 9), allows the piston 14 to retract and reduce chain load when fluid pressure is reduced during engine shutdown, but not so much as to leave the chain uncontrolled during engine restart. This also allows the piston 14 to extend out as far as required by the timing drive to control the drive at high engine speed but return back to a lower extension at low engine speed but still prevent tooth jump during engine shutdown. The retraction of the piston 14 is limited by the amount of backlash of the contractible circlip 106. However, it should be noted that nothing limits retraction of the piston 14 when the pressure in the second pressure chamber 28 is sufficient to prevent the spool piston 8 from being biased by the spring towards the first end of the spool piston bore 22*b*.

A lock pin 4 (see FIG. 1) may lock the spool piston 8 in place for shipping or assembly, preventing any movement during these processes.

In one embodiment the first supply 25 is connected to the second supply 26. In an alternate embodiment, the first supply 25 and second supply 26 are not directly connected.

While the spool piston 8 is shown as being received within a radially extending bore of the housing 22*b*, other configurations and arrangements of the spool piston 8 relative to the piston 14 and the expandable circlip 6 may be used to apply force to the legs 106*b*, 106*c* of the contractible circlip 106, such that the ring shaped body 6*a* of the contractible circlip 106 engages the grooves 16 of the piston 14.

It should be noted that while the first embodiment shows a circlip in which the legs 6*b*, 6*c* are crossed, a clip in which the legs are not crossed may also be used, similar to the configuration shown in the third embodiment. Likewise, while a circlip 106 with uncrossed legs 106*b*, 106*c* was shown in the third embodiment, a circlip in which the legs are crossed may be used.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for use with a chain or a belt comprising:
   a housing comprising a piston bore, a spool piston bore in fluid communication with the piston bore, and a housing shoulder between the piston bore and the spool piston bore;
   a piston having a plurality of grooves formed along at least a portion of an outer circumference of the piston, the piston being slidably received within the piston bore and forming a first pressure chamber within the piston bore;
   a piston spring biasing the piston in an outward direction from the housing; and
   a spool piston slidably received by the spool piston bore, biased in a first direction within the spool piston bore by a spool piston spring, the spool piston having a cutout of a length defined by a first spool piston shoulder and a second spool piston shoulder;
   a contractible circlip comprising a ring shaped body attached to a first leg and a second leg, the first leg and second leg of the contractible circlip being received within the cutout of the spool piston and the second leg contacting the housing shoulder, the contractible circlip having a free state in which the ring shaped body is disengaged from the plurality of grooves of the piston, and an unfree state in which the ring shaped body is engaged with the plurality of grooves of the piston and the first leg and the second leg are moved toward each other;
   wherein when force of the spool piston spring is greater than a force of a pressure of the fluid supplied from a second supply to a second pressure chamber in the spool piston bore at an end of the spool piston opposite the spool piston spring, the second spool piston shoulder disengages the second leg of the contractible circlip, expanding the ring shaped body of the contractible circlip, disengaging the ring shaped body of the contractible circlip from the grooves on the outer circumference of the piston, such that the piston can move towards the housing and reduce chain load when fluid pressure is reduced in the first pressure chamber during engine shutdown.

2. The tensioner of claim 1, wherein the first leg of the contractible circlip is secured to the housing shoulder.

3. The tensioner of claim 1, wherein the spool piston bore further comprises a circlip in the second pressure chamber, which acts as a stop to limit the movement of the spool piston within the spool piston bore.

4. The tensioner of claim 1, wherein when fluid is supplied from the second supply to the second pressure chamber in the spool piston bore at the end of the spool piston opposite the spool piston spring, pressure of the fluid in the second pressure chamber biases the spool piston against the spool piston spring, and the second spool piston shoulder pushes the second leg of the contractible circlip towards the first leg, contracting the ring shaped body of the contractible circlip, and engaging the ring shaped body with the grooves on the outer circumference of the piston.

* * * * *